United States Patent Office 3,463,807
Patented Aug. 26, 1969

3,463,807
ALPHA-BENZOYL-OMEGA-DIALKYLAMINO
ACID ESTERS
Donald L. Trepanier, Indianapolis, Ind., assignor to The
Dow Chemical Company, Midland, Mich., a corporation of Delaware
No Drawing. Filed Sept. 28, 1966, Ser. No. 582,515
Int. Cl. C07c 101/34; A61k 27/00
U.S. Cl. 260—471  4 Claims

ABSTRACT OF THE DISCLOSURE

α-Benzoyl-ω-dialkylamino acid esters are prepared by the reaction of a lower alkyl ester of benzoyl acetic acid with sodium hydride and a dialkylaminoalkyl chloride. The compounds are useful as chemical intermediates, as anthelmintics, as sedatives and as anticonvulsants.

---

This invention is directed to novel α-benzoyl-ω-dialkylamino acid esters and is particularly concerned with compounds corresponding to the formula

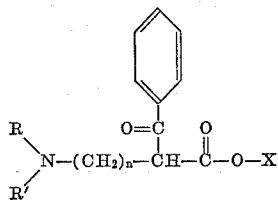

wherein R and R' each independently represent methyl, ethyl and propyl, X represents a lower alkyl group containing from 1 to 4 carbon atoms, inclusive, and $n$ represents an integer from 2, to 3, to 4. The novel esters are clear oils which are soluble in a variety of organic solvents such as acetone and benzene and somewhat less soluble in water.

The novel esters are valuable intermediates in the preparation of 1-phenyl-2-dialkylaminoalkyl-1,3-propanediols and 3-phenyl-4-dialkylaminoalkyl-pyrazol-5-ol compounds. 1-phenyl-2-dialkylaminoalkyl - 1,3 - propanediols are disclosed and claimed in my copending application, Ser. No. 582,542, filed concurrently herewith. 3-phenyl-4-dialkylaminoalkyl-pyrazol-5-ol compounds are disclosed and claimed in my copending application, Ser. No. 582,490, filed concurrently herewith. The novel compounds of the present invention have also been found useful as anthelmintic agents. The compounds also have utility as sedatives and anticonvulsants and are particularly useful for administration to laboratory animals in studying the behavior thereof and in ascertaining drug effects on the central and peripheral nervous system.

The esters of the invention are prepared by the reaction of a lower alkyl ester of benzoyl acetic acid with sodium hydride and a dialkylaminoalkyl chloride corresponding to the formula:

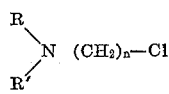

The reaction consumes the hydride and the benzoyl acetic acid ester in substantially equimolar proportions and the use of these reactants in such proportions is preferred. The reaction consumes one mole of dialkylaminoalkyl chloride for every mole of benzoyl acetic acid ester and the use of these reactants in such proportions is desirable, a slight excess of dialkylaminoalkyl chloride being preferred. The reaction is conveniently carried out in the presence of an inert organic solvent as reaction medium. Representative inert organic solvents which are suitable reaction media include benzene, toluene, xylene and mixtures of the same. The reaction liberates sodium and chloride, resulting in the formation of a sodium chloride precipitate in the reaction medium. The reaction proceeds readily when the reactants are contacted, preferably at the boiling tempertaure of the mixture. The precipitate is removed by such conventional methods as filtration or decantation.

In a convenient procedure, the hydride is dispersed in xylene and the benzoyl acetic acid ester is added portionwise. The mixture is heated for a short period of time, preferably from 1 to 2 hours, after which the dialkylaminoalkyl chloride is added dropwise. The resulting mixture is then heated to the boiling point under reflux for a time period of about 20 to 22 hours. The salt precipitate is removed by filtration and the filtrate extracted with aqueous acid. The acid extract is then made just basic with aqueous sodium hydroxide and extracted with ether. The ester product is separated from the ether extract by such conventional methods as evaporation. The α-benzoyl-ω-dialkylamino acid ester can be purified by such conventional procedures as washing and distillation.

The following examples illustrate the invention but are not to be construed as limiting the same.

Example 1

A solution of ethyl benzoylacetate (288 grams; 1.5 moles) in 200 milliliters of dry xylene was added dropwise over a period of about one hour to a stirred suspension of sodium hydride (36 grams; 1.5 moles) in 3 liters of dry xylene. After the addition was completed, the mixture was stirred for one hour and heated. Over a subsequent period of two hours, a solution of 3-(diethylamino)-1-propyl chloride (296 grams; 1.6 moles) in 500 milliliters of anhydrous benzene was added dropwise to the mixture. The resulting reaction mixture was stirred and refluxed until precipitation of the salt was substantially complete, after which the cooled mixture was filtered and the filter cake washed with 200 milliliters of benzene. The combined filtrate and washings were extracted with a solution of 142 milliliters of concentrated hydrochloric acid in 600 milliliters of water. The acid extract was cooled, made basic by the addition of a cold solution of 72 grams of sodium hydroxide in 150 milliliters of water and extracted with five 250-milliliter portions of ether. The ether extracts were combined, washed with three 75-milliliter portions of water and dried over anhydrous magnesium sulfate. The ether was evaporated in vacuo leaving the product as a residue. The residue was distilled under reduced pressure and a fraction boiling at 168°–182° C. under a pressure of 1.3 milliliters of mercury collected. This material was redistilled and the ethyl 2-benzoyl-5-diethylamino-pentanoate product collected as a fraction boiling at 163° C. under a pressure of 0.7 millimeter of mercury. The structure of the product was confirmed by infrared spectroscopy and the product was found by elemental analysis to have carbon, hydrogen and nitrogen contents of 71.34, 8.81 and 4.67 percent, respectively, as compared with the theoretical contents of 70.78, 8.91 and 4.59 percent, respectively, calculated for the named structure.

In substantially the same procedure, butyl 2-benzoyl-2-diethylamino-hexanoate, having a molecular weight of 319.4, is prepared by contacting one molar proportion of sodium hydride, one molar proportion of butyl benzoylacetate and a slight excess of 4-(diethylamino)-1-butyl chloride.

Example 2

Ethyl benzoylacetate (673 grams; 3.5 moles) in xylene solution was added dropwise to a xylene suspension of sodium hydride (3.5 moles) after which a xylene solution of 2-(diisopropylamino)-ethyl chloride (620 grams; 3.1 moles) was added dropwise to the mixture. The mixture, containing 7 liters of xylene, was heated with stirring for 20 hours at the boiling temperature of the mixture. The hot reaction mixture was suction filtered to remove the salt, the salt washed with three 100 milliliter portions of benzene and the combined filtrate and washings extracted with a solution of 300 milliliters of concentrated hydrochloric acid in 800 milliliters of water. The acid extract was cooled, made basic with cold sodium hydroxide solution and extracted with ether. The ether extract was washed with four 150-milliliter portions of water, dried over magnesium sulfate and distilled under reduced pressure to remove the ether. The residual oil left after this distillation was distilled in vacuo and the ethyl 2-benzoyl-4-(diisopropylamino)-butyrate was collected as a fraction boiling at 155°–160° C. under a pressure of 0.85–0.95 millimeter of mercury.

Example 3

Ethyl benzoylacetate (288 grams; 1.5 moles) was dissolved in 200 milliliters of dry xylene and the solution added dropwise to a suspension of sodium hydride (36 grams; 1.5 moles) in 3 liters of xylene over a period of one hour. The resulting mixture was heated and stirred for one hour, after which 3-(dimethylamino)-1-propyl chloride (195 grams; 1.6 moles) dissolved in 500 milliliters of benzene was added dropwise. The addition of the 3-dimethylaminopropyl chloride solution was carried out over a period of two hours. The resulting mixture was then refluxed with stirring for 22 hours, after which the mixture was cooled and filtered. The filter cake was washed with three 75-milliliter portions of benzene and discarded. The combined filtrate and washings were extracted with a solution of 142 milliliters of concentrated hydrogen chloride in 600 milliliters of water. The acid extract was cooled, made basic by the addition of a cold solution of 72 grams of sodium hydroxide in 150 milliliters of water and extracted with five 250-milliliter portions of ether. The combined ether extracts were washed three times with sodium carbonate solution and the washings discarded. The ether was removed by evaporation in vacuo and the oily residue was distilled in vacuo. The ethyl 2-benzoyl-5-(dimethylamino)-pentanoate product was collected as a fraction boiling at 148°–155° C. under a pressure of 0.60–0.70 millimeter of mercury. The product was found by analysis to have carbon, hydrogen and nitrogen contents of 69.43, 8.20 and 4.90 percent, respectively, as compared with the theoretical contents of 69.27, 8.36 and 5.05 percent, respectively, calculated for the named structure.

In substantially the same procedure, ethyl 2-benzoyl-4-(diethylamino)-butyrate, having a molecular weight of 291.4, was prepared by combining and refluxing ethyl benzoylacetate (288 grams; 1.5 moles), sodium hydride (36 grams; 1.5 moles) and 2-(diethylamino)-ethyl chloride (218 grams; 1.6 moles) in 3200 milliliters of xylene. The procedure was varied in that the reaction mixture was held for about four days between the addition of the ethyl benzoylacetate to the sodium hydride and the addition of the 2-(diethylamino)-ethyl chloride. The ethyl 2-benzoyl-4-(diethylamino)-butyrate was found to boil at 144°–146° C. under a pressure of 0.45 millimeter of mercury.

The novel esters can be employed as the sole toxicant in anthelmintic compositions. For such uses, the toxicant compound can be administered in the form of capsules, tablets or boluses or dispersed in animal feed compositions. Such compositions are generally given as a single dose or at frequent intervals over a short period. In representative operations, dogs known to be infested with hookworms were administered a single oral dose of a capsule containing ethyl 2-benzoyl-5-(diethylamino)-pentanoate at a dosage rate of 100 milligrams per kilogram of body weight as the sole toxicant therein. Substantially complete kills of the hookworms were found by necropsy of the test animals five days after administration of the test compound. In similar operations, dogs known to be infested with hookworms were administered a single oral dose of a capsule containing ethyl 2-benzoyl-5-(dimethylamino)-pentanoate at a dosage rate of 100 milligrams per kilogram of body weight as the sole toxicant therein. Substantially complete kills of the hookworms were found by necropsy of the test animals five days after administration of the test compound.

In other operations, ethyl 2-benzoyl-4-(diethylamino)-butyrate was administered to mice by intraperitoneal injection at a dosage rate of 100 milligrams per kilogram. One hour after injection of the test compound, the mice were treated with hexobarbital by an intraperitoneal injection at a dosage rate of 100 milligrams per kilogram. A similar group of mice, not pretreated with the test compound, was administered a similar dose of hexobarbital. The administration of hexobarbital caused the mice to sleep. The mice pretreated with the ethyl 2-benzoyl-4-(diethylamino)-butyrate compound were observed to sleep about 2.6 times as long as the mice receiving only hexobarbital.

I claim:
1. The α-benzoyl-ω-dialkylamino acid esters corresponding to the formula

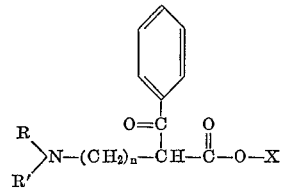

wherein R and R' each independently represent a member of the group consisting of methyl, ethyl and propyl, X represents a lower alkyl group containing from 1 to 4 carbon atoms, inclusive, and $n$ represents an integer from 2 to 4, inclusive.

2. The compound claimed in claim 1 wherein the compound is ethyl 2-benzoyl-5-(diethylamino)-pentanoate.

3. The compound claimed in claim 1 wherein the compound is ethyl 2-benzoyl-4-(diethylamino)-butyrate.

4. The compound claimed in claim 1 wherein the compound is ethyl 2-benzoyl-5-(dimethylamino)-pentanoate.

References Cited

UNITED STATES PATENTS 3,409,672  11/1968  Trepanier _____ 260—570.6

LORRAINE A. WEINBERGER, Primary Examiner

L. ARNOLD THAXTON, Assistant Examiner

U.S. Cl. X.R.

260—999